United States Patent
Douglas-Hamilton et al.

(10) Patent No.: US 8,422,128 B2
(45) Date of Patent: Apr. 16, 2013

(54) MODULAR OBJECTIVE ASSEMBLY

(75) Inventors: Diarmaid H. Douglas-Hamilton, Beverly, MA (US); Thomas G. Kenny, Ipswich, MA (US)

(73) Assignee: Hamilton-Thorne, Inc., Beverly, MA (US)

( * ) Notice: Subject to any disclaimer, the term of this patent is extended or adjusted under 35 U.S.C. 154(b) by 702 days.

(21) Appl. No.: 12/615,036

(22) Filed: Nov. 9, 2009

(65) Prior Publication Data
US 2010/0118395 A1     May 13, 2010

Related U.S. Application Data

(60) Provisional application No. 61/112,285, filed on Nov. 7, 2008.

(51) Int. Cl.
*G02B 21/06* (2006.01)
(52) U.S. Cl.
USPC ............................................ 359/389; 607/89
(58) Field of Classification Search .................. 359/368, 359/385, 389; 607/89
See application file for complete search history.

(56) References Cited

U.S. PATENT DOCUMENTS

| | | | |
|---|---|---|---|
| 2,471,879 A | 5/1949 | Lowber et al. | |
| 3,796,220 A * | 3/1974 | Bredemeier | 606/18 |
| 4,515,439 A | 5/1985 | Esswein | |
| 4,617,467 A | 10/1986 | Senftle et al. | |
| 4,884,880 A | 12/1989 | Lichtman et al. | |

(Continued)

FOREIGN PATENT DOCUMENTS

| | | |
|---|---|---|
| DE | 36 41 341 | 6/1988 |
| JP | 57 208524 | 12/1982 |

(Continued)

OTHER PUBLICATIONS

International Search Report dated Aug. 5, 2009 from PCT Application No. PCT/US2009/046847 and International Search Report dated Dec. 28, 2009 from PCT Application No. PCT/US2009/063734.

(Continued)

*Primary Examiner* — Alessandro Amari
(74) *Attorney, Agent, or Firm* — Stroock & Stroock & Lavan LLP

(57) ABSTRACT

A modular laser objective for use with a microscope is provided. A mounting modular body permits the modular objective to be releasably mounted to the turret of a microscope. The objective has an optical axis that permits an image beam to be emitted through the objective toward the eyepiece of a microscope. The modular body supports a mirror positioned at an angle to the optical axis of the objective. A modular laser assembly is mounted on the modular body on a first side of the mirror for directing a laser beam toward the mirror so that the energy is reflected off the mirror and through the objective in a direction that is substantially aligned with the optical axis of the objective. A modular indicator assembly is received in the modular body and includes a source of light positioned with the light incident on the other side of the mirror to reflect a beam of light in a direction opposite to the direction of the laser beam to provide an optical representation at the eyepiece of a microscope or on a camera of the position on the target of the laser beam being emitted by the objective.

9 Claims, 6 Drawing Sheets

U.S. PATENT DOCUMENTS

| | | | |
|---|---|---|---|
| 4,904,085 | A | 2/1990 | Spillman, Jr. et al. |
| 5,349,468 | A | 9/1994 | Rathbone et al. |
| 5,610,712 | A | 3/1997 | Schmitz et al. |
| 5,754,289 | A | 5/1998 | Ozaki et al. |
| 5,759,781 | A | 6/1998 | Ward et al. |
| 5,936,728 | A | 8/1999 | Bouzid |
| 5,972,667 | A | 10/1999 | Conia et al. |
| 6,052,223 | A | 4/2000 | Yoneyama et al. |
| 6,251,615 | B1 | 6/2001 | Oberhardt |
| 6,313,944 | B2 | 11/2001 | Kawahito |
| 7,072,377 | B2 | 7/2006 | Douglas-Hamilton |
| 7,359,116 | B2 | 4/2008 | Kenny |
| 8,149,504 | B2 * | 4/2012 | Kenny et al. ............... 359/389 |
| 2003/0090792 | A1 * | 5/2003 | Kenny et al. ............... 359/385 |
| 2005/0068614 | A1 | 3/2005 | Yoneyama et al. |
| 2007/0291798 | A1 | 12/2007 | Kenny et al. |

FOREIGN PATENT DOCUMENTS

| | | |
|---|---|---|
| JP | 2008 197127 | 8/2008 |
| WO | WO 98/14816 | 4/1998 |
| WO | WO03/034124 | 4/2003 |

OTHER PUBLICATIONS

Berns, M.W. et al. "Laser scissors and tweezers." Methods Cell Biol. 1998;55:71-98.

Cohen, J. et al. "Implantation enhancement by selective assisted hatching using zona drilling of human embryos with poor prognosis." Hum. Reprod. May 1992;7(5):685-91.

Douglas-Hamilton, D.H. et al. "Thermal effects in laser-assisted pre-embryo:zona drilling." J. Biomed. Optics Apr. 2001;6(2):205-213.

Germond, M. et al. "Microdissection of mouse and human zona pellucida using a 1.48 IJm diod laser beam: efficiency and safety of the procedure." Fertility and Sterility Sep. 1995;64(3):604-611.

Montag, M. et al. "Laser-assisted microdissection of the zona pellucida facilitates polar body biopsy." Fertility and Sterility Mar. 1998;69(3):539-542.

Petit, C. et al. "Use of PRINS for preconception screening of polar bodies for common aneuploidies." Prenatal Diagnosis 2000;20:1067-1071.

Strom, C.M. et a/. "Neonatal outcome of preimplantation genetic diagnosis by polar body removal: the first 109 infants." Pediatrics Oct. 2000; 106(4):650-3.

Veiga, A. et a/. "Laser blastocyst biopsy for preimplantation diagnosis in the human." Zygote Nov. 1997;5(4):351-4.

Viville, S. eta/. "Human embryo research in France." Hum. Reprod. Feb. 2002;17(2):261-3.

Cell Robotics International, Inc. "CRI Workstation. LaserScissors Workstation" pp. 1-2, retrieved from Internet on Oct. 9, 2001 http:www.cellrobotics.com/workstation|lsws.html.

Cell Robotics International, Inc. "CRI Workstation. LaserTweezers Workstation" p. 1, retrieved from Internet on Oct. 9, 2001 http:www.cellrobotics.com|workstation|ltws.html.

* cited by examiner

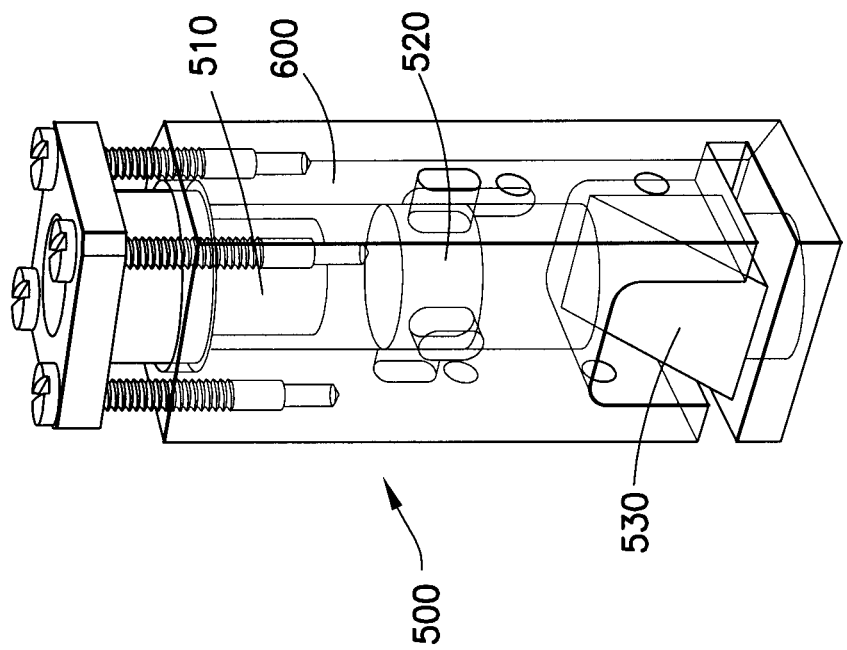
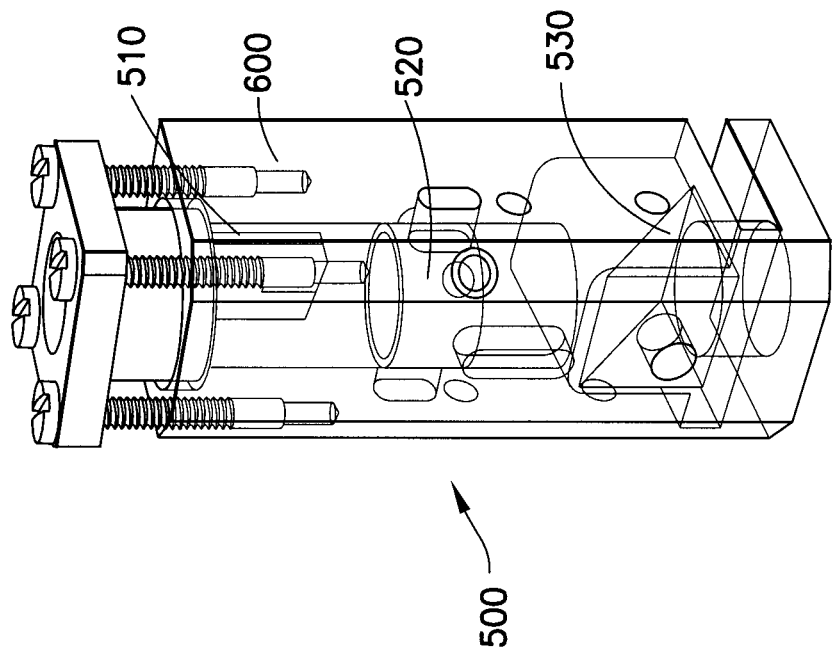

MODULAR OBJECTIVE ASSEMBLY

CROSS REFERENCE TO RELATED APPLICATIONS

This application claims priority to U.S. Provisional Patent Application No. 61/112,285, filed Nov. 7, 2008, entitled "Indicator and Laser Assembly" the contents of which are hereby incorporated by reference in its entirety.

FIELD OF THE INVENTION

The present invention relates generally to a modular objective assembly for use with a microscope and, in particular to a modular objective assembly to be releasably mounted to the turret of a microscope that includes a modular laser sub-assembly and modular indicator sub-assembly that permits the user of a microscope to see an indicator in the eyepiece of a microscope of the position where laser energy is directed at a specimen positioned at the objective of a microscope.

BACKGROUND

Recent advances in biology and medicine have led to the development of laser beam microsurgery on cells. The laser beam is well adapted to micromanipulation of small objects, such as single cells or organelles. It provides the advantage of non-contact ablation, volatilization, sterilization and denaturing, cutting, and other forms of thermal and actinic-light treatment. The four parameters of focal spot size, laser wavelength, pulse duration, and laser power, provide a variety of regimes suitable for different applications.

One example of a use of laser beam microsurgery is the application of laser beams to the treatment of a mammalian oocyte and embryo. However, laser beam microsurgery in a number of inverted or upright microscopes can be utilized for many different surgical or medical applications.

In accordance with commonly practiced methods of laser beam microsurgery, the person conducting the microsurgery watches a screen displaying the sample and an indication of where the laser beam would be applied on the sample. Sometimes, a plurality of isothermal contour rings can be provided to demonstrate the range of thermal effects of the laser beam. Examples of such heat rings are provided in U.S. Pat. No. 7,359,116 and U.S. patent application Ser. No. 11/764,064.

Combining an objective, a laser and a directional beam to provide a visible indication of the targeting of the invisible laser beam has been proposed in U.S. patent application Ser. No. 12/481,363, filed on Jun. 9, 2009, now U.S. Pat. No. 8,149,504. However, the structure of these laser objectives lead to interference problems with the turret geometry of certain microscopes. Accordingly, a self-contained modular objective that eliminates such interference issue would be desirable.

SUMMARY OF THE INVENTION

This invention relates, in general, to a modular assembly having an objective, a laser assembly and an indicator assembly and the use thereof. The invention preferably improves upon systems and methods by providing a modular laser assembly configured and connected to an objective to preferably provide a laser beam coinciding with the optical axis of the objective, as well as providing a visible indication of the position of the laser via the eyepiece of the microscope.

According to an embodiment of the invention, the modular objective assembly can provide a mounting modular body that is mountable on a turret of a microscope. The modular body includes an objective assembly having an optical axis that permits an image beam to be emitted through the objective toward the eyepiece of a microscope and through a mirror positioned at an angle to the optical axis of the objective. A modular laser assembly is positioned on the modular body on a first side of the mirror for directing laser energy toward said mirror so that the laser energy is reflected off of the mirror and through the objective in a direction that is substantially aligned with the optical axis. A modular indicator assembly is also mounted on the modular body and provides an indicator beam being emitted toward the other side of the mirror, for directing the light beam in a direction that is opposite to the direction of the laser energy to permit an optical representation at the eyepiece of the microscope, thus being visible therethrough. The person conducting the microsurgery can thus view the sample and the position of the laser relative to the sample through the eyepiece while conducting the microsurgery.

Other objects and features of the present invention will become apparent from the following detailed description, considered in conjunction with the accompanying drawings. It is to be understood, however, that the drawings are designed solely for the purpose of illustration and not as a definition of the limits of the invention, for which reference should be made to the appended claims.

BRIEF DESCRIPTION OF THE DRAWINGS

The particular features and advantages of the invention as well as other objects will become apparent from the following description taken in connection with the accompanying drawings, in which:

FIG. 5 is a perspective view of the laser module of the instant invention with the mounting modular body shown in transparency to facilitate an understanding of the relationship of components of the instant invention;

FIG. 6 is a perspective view from the opposite side of the laser module depicted in FIG. 5, with the mounting modular body shown in transparency to facilitate an understanding of the arrangement of components thereof.

DETAILED DESCRIPTION

An illustrative embodiment of the present invention relates to a modular system for providing a laser beam coinciding with the optical axis of the objective suitable for use with a microscope, and an indicator beam that is visible through the eyepiece of a microscope, the visible beam preferably indicating the position of a laser beam. The invention also relates to a modular objective assembly having an objective, an indicator assembly and a laser assembly; a microscope having an objective assembly; as well as to an indicator assembly that can be used with a microscope or other device with which laser manipulation is conducted. The invention is also directed toward providing a modular objective that will assist in conducting laser microscopy using an indicator beam indicating the position of the laser through the eyepiece of the microscope.

Figure 1A:
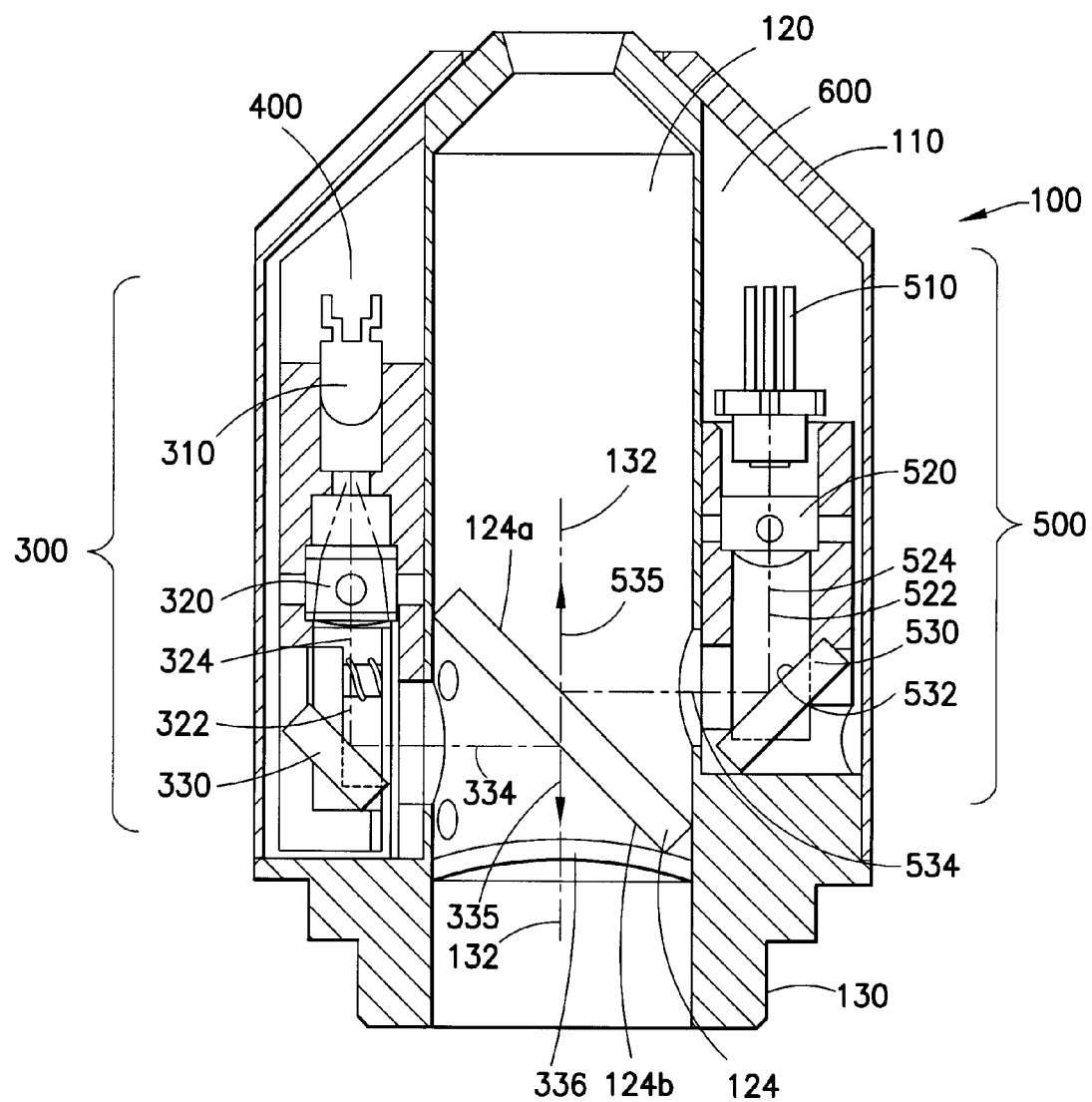
FIG. 1A is a schematic view of the modular microscope objective of the instant invention.
Figure 1B:
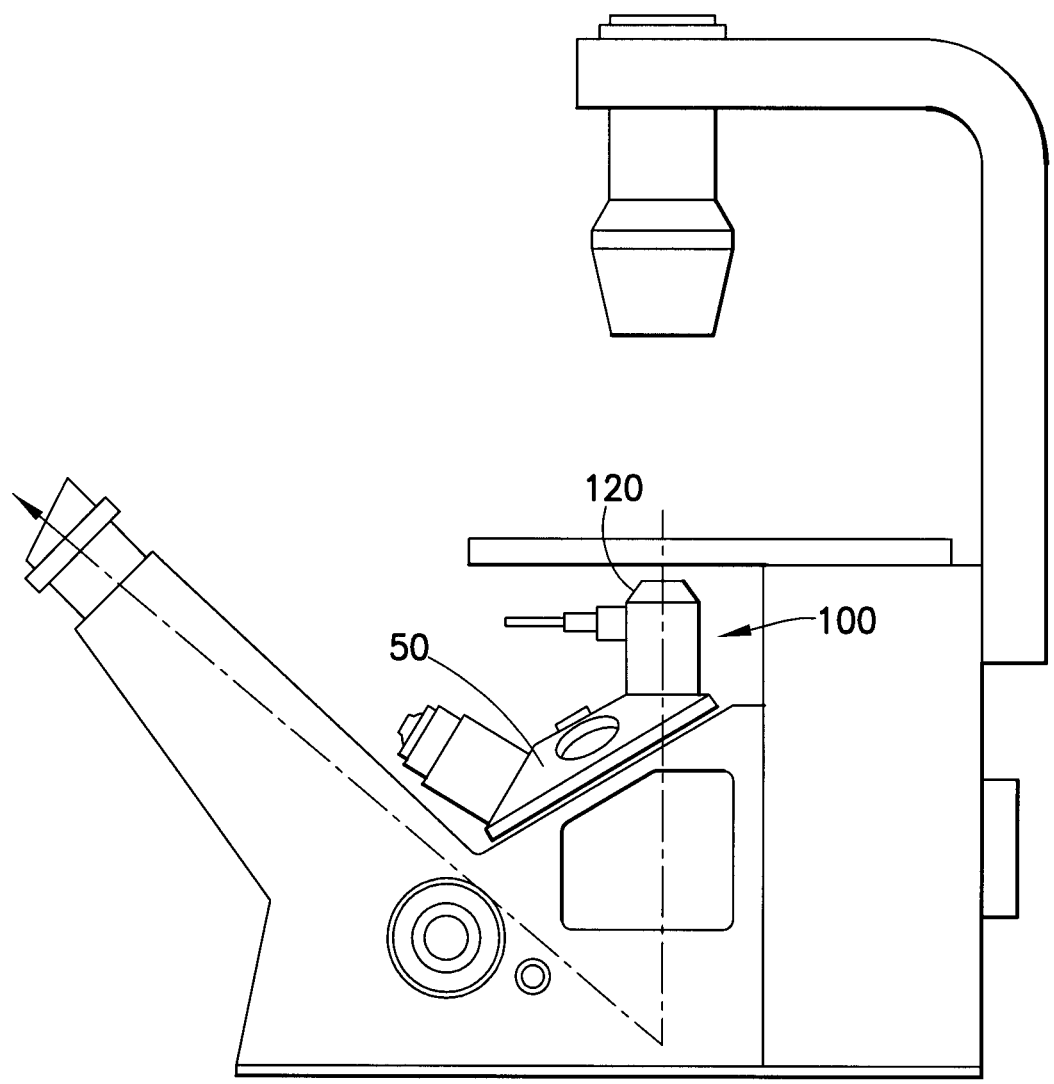
FIG. 1B is an illustration of the microscope objective of the instant invention mounted on a microscope turret.
Figure 2:
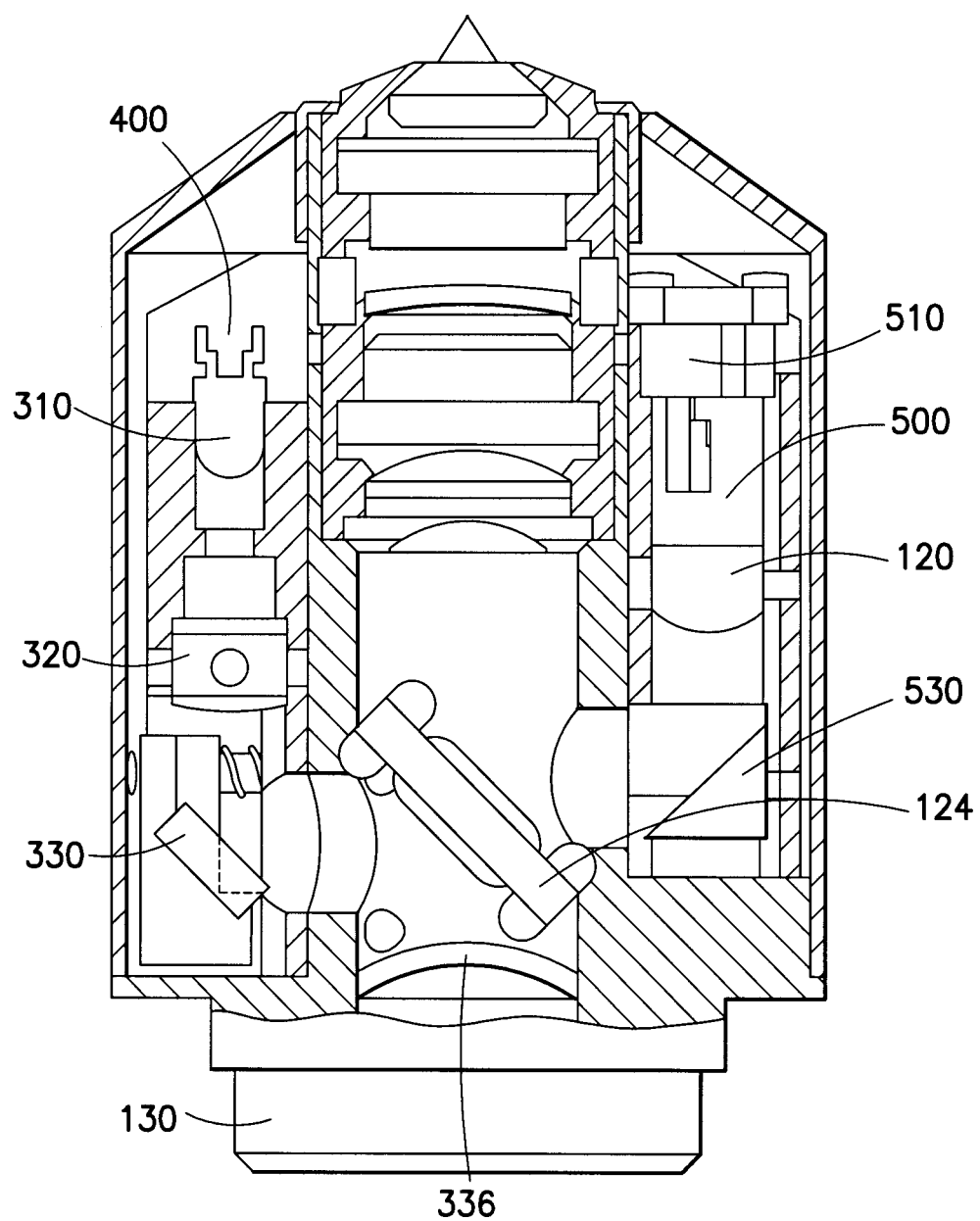
FIG. 2 is a cutaway view of the modular microscope objective of the instant invention.
Figure 4:
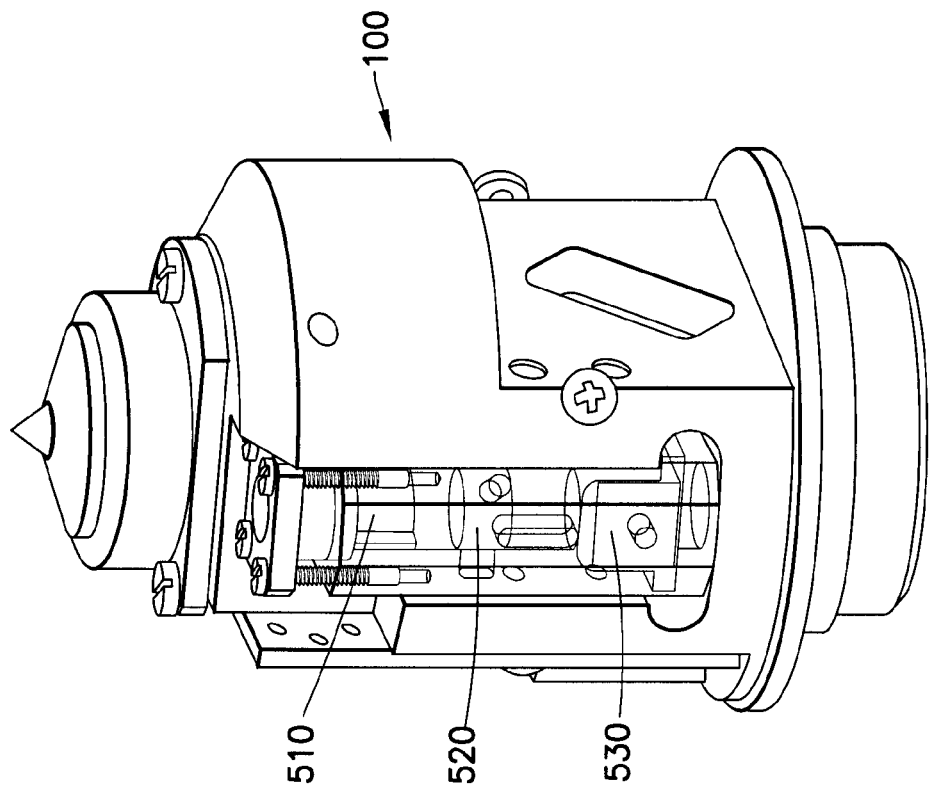
FIG. 4 is a perspective view of the mounting modular body of the modular microscope objective of the instant invention.
Figure 3:
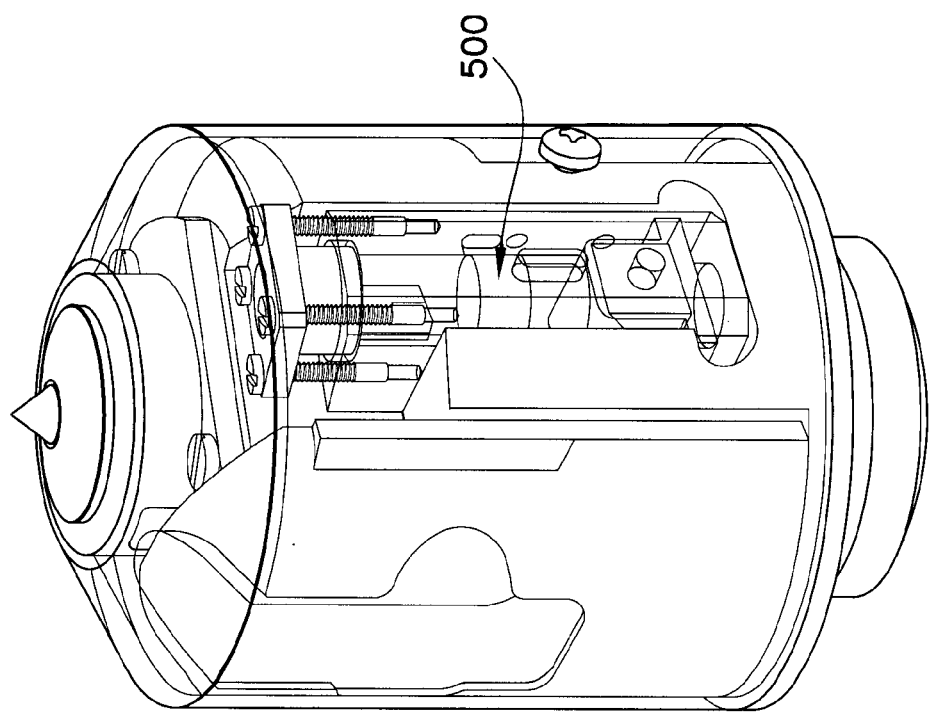
FIG. 3 is a perspective view of a modular microscope objective of the instant invention, the housing shown in transparency thereof and transparency to facilitate an understanding of the arrangement components thereof.
Figure 7:
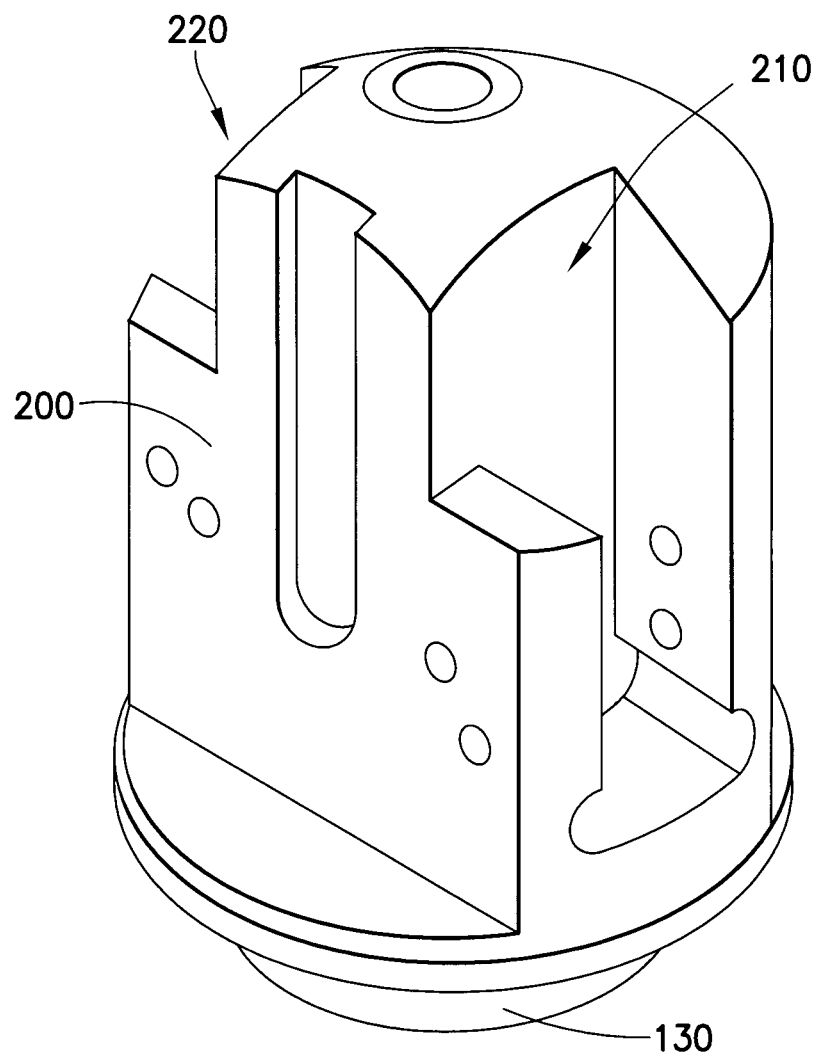
FIG. 7 is a perspective view of the mounting modular body for receiving each of the modules of the modular microscope objective of the instant invention.

Reference is first made to FIGS. 1A and 1B and several other figures to understand the functionality of the modular objective of the instant invention and the functional components thereof. FIG. 1A is a schematic view of the modular objective assembly 100 of the instant invention and is shown as having a housing 110 having an objective 120, a turret mount 130, a modular indicator assembly 300 and a modular laser assembly 500. As is depicted in FIG. 1B objective assembly 100 is preferably mountable onto a turret 50 of a conventional microscope via turret mount 130. For example, as is depicted in FIG. 7, a modular body, generally indicated as 200, includes a turret mount 130, which can include a threaded portion corresponding to a threaded portion of the turret of the microscope such that objective assembly 100 can be screwed onto the turret. Alternatively, turret mount 130 can be slid or snapped into place, or include an external locking mechanism to mount modular objective assembly 100 onto the turret and preferably maintain objective assembly 100 in place on the turret of the microscope.

Referring again to FIG. 1A, objective 120 preferably has an optical axis 122, and the imaging beam travels close to parallel to this axis. Preferably, the microscope emits an image beam through the stage, objective 120, and is directed into the eyepiece of a microscope such that the sample on the stage can be seen via the eyepiece.

The image beam preferably focuses via the tube lens and eyepiece (not shown), at the eye of the viewer and can be adjusted to adapt to the viewer. The image beam is preferably close to coaxial with optical axis 122 when objective assembly 100 is mounted onto the turret of the microscope. Accordingly, the sample on the stage of the microscope, for example, where the sample is being studied, manipulated, etc. along the optical path 122 of objective 120 can be seen through the eyepiece of the microscope.

In accordance with the embodiment shown, objective assembly 100 also includes a modular laser assembly 500 that functions in the manner shown and described in U.S. Pat. No. 7,359,116 and U.S. patent application Ser. No. 11/764,064, both of which have been assigned to the same assignee Hamilton Thorne, Inc. and are incorporated in their entirety by reference herein.

Referring to FIG. 1A, laser assembly 500 preferably includes a laser source 510 such as a laser diode, a collimating lens 520 and a mirror 530. Laser source 510 preferably emits an elliptical cone of laser light, toward collimating lens 520, more preferably diverging from laser source 510 toward collimating lens 520. It is to be understood that the laser light emitted by laser source 510 toward collimating lens 520 can converge or be collimated without deviating from the scope of the invention. The laser light is preferably transmitted toward and through collimating lens 520, after which time the laser light is collimated. Therefore, the laser light can exit collimating lens 520 as a collimated (or close to collimated) laser beam 522. The laser beam 522 can have a wavelength in the range of 300 nm to 1500 nm, power in the range of 10 mW to 1000 mW and a pulse duration in the range of 1 microsecond to 1 second. This wavelength range should not be interpreted to constrain the wavelengths of the laser to be used in accordance with the instant invention, since any wavelength produced by a small laser source should be usable with the instant invention.

Collimated laser beam 522 can be emitted toward mirror 530. In accordance with an exemplary embodiment of mirror 530, a coating 532 such as an infrared reflector can be provided on mirror 530 facing laser source 510. Preferably, coating 532 enhances the reflectivity of an infrared collimated laser beam 522 off mirror 530 toward mirror 124. It is reflected off mirror 124 toward objective assembly 120.

FIG. 1A illustrates the path of collimated laser beam 522 from collimating lens 520 to and through objective 120. Preferably, collimated laser beam 522 exits collimating lens 520 and travels along a first laser path 524 toward mirror 530. Once collimated laser beam 522 contacts mirror 530, collimated laser beam 522 reflects off mirror 530 and travels along a second laser path 534 toward the surface 124a of dichroic mirror 124. A dichroic mirror 124 is preferably located within objective 120 such that the laser beam 522 traveling along the second laser path 534 contacts the objective mirror surface 124a and is reflected off the objective mirror 124 into a third laser path 535. The dichroic mirror is coated with a layer suitable for enhancing IR reflection at the incident angle, which is generally 45°. The third laser path 535 is preferably coaxial with and substantially coincides with the optical axis 122 of objective 120, thus traveling within objective 120 and further toward the stage of the microscope. Accordingly, collimated laser beam 522 is also coaxial and antiparallel with the image beam of the microscope traveling in the opposite direction, toward the object and thus away from eyepiece. Since the laser beam may be in the infrared wavelength region as well as traveling away from the eyepiece, it is likely to be invisible. Therefore, the collimated laser beam 522 is unlikely to be visible via the eyepiece of the microscope. The position of the collimated laser beam 522 and preferably the heat isothermal contour rings associated with it can be displayed on a screen, which a person may watch while conducting the microscopy.

As shown in FIG. 1A, a modular indicator assembly 300 can be provided, preferably on the opposite side of objective mirror 124 from laser assembly 500. As shown, indicator assembly can include an indicator light source 310 such as an LED (light emitting diode), which emits light toward mirror an indicator mirror 330. Preferably, the light is emitted from the indicator source 310 toward a reducing element 340, thereafter toward collimating lens 320 which collimates the light such that a collimated beam of light, referred to herein as indicator collimated beam 322, exits indicator collimating lens 320 toward indicator mirror 330. Preferably the wavelength is close to 650 nm, although for some users colorblindness indicates that a shorter wavelength is preferable.

Indicator collimated beam 322 can then reflect off indicator mirror 330 along light path 334 toward the opposite surface of two-sided objective mirror 124 such that the indicator beam 322 is reflected toward the eyepiece of the microscope. Preferably, indicator light source 310 and indicator collimating lens 320 are mounted on an indicator mount 360 which is preferably connected to housing 110.

Referring to FIG. 1A, indicator collimated beam 322 preferably travels toward indicator mirror 330 along a first indicator path 324 from indicator collimating lens 320. After reflecting off indicator mirror 330, indicator beam 322 travels along a second indicator path 334 until it reflects off objective mirror 124 into a third indicator path 335. Preferably, third indicator path 335 is coaxial with but is the opposite direction to third laser path 535 and thus optical path or optic axis 122 of objective 120. More preferably, third indicator path 335 is coaxial to and substantially coincides with the image beam of the microscope and travels toward the eyepiece of the microscope. Reflection off the surfaces of the dichroic mirror 124 may be enhanced by coatings designed to preferentially simultaneously reflect the light emitted by indicator source 310, as well as the light from the laser assembly mirror 532.

Preferably, the diameter of light emitted toward indicator collimating lens 320 is controlled, for example, reduced from the diameter of indicator light source 310. For example, a reducing element 340 can be provided between indicator light source 310 and indicator collimating lens 320 to reduce the diameter of the indicator light being emitted toward indicator collimating lens 320. An embodiment of reducing element 340 can have a generally round shape, such as a substantially round and flat disk, with a central aperture. Alternatively, the reducing element can be elongated, cylindrical, or rectangular, hexagonal, etc. without deviating from the scope of the invention. An example of the reducing element, as well as an exemplary embodiment of the indicator assembly is described in further detail in U.S. patent application No. 12/481,363 entitled OPTICAL INDICATOR FOR MICROSCOPE LASER BEAM MANIPULATION the contents of which are incorporated by reference as if fully set forth herein.

The reducing element preferably includes an aperture through which indicator light can be emitted toward indicator collimating lens 320. Preferably, the reducing element prevents the indicator light from passing through the remaining portion of reducing element. Therefore, the diameter of the effective light source emitted toward indicator collimating lens 320 can be controlled by controlling the size of aperture. In accordance with an exemplary embodiment, aperture has a diameter of between about 5 to 10 µm, more preferably approximately 5 µm. Whereas the aperture may have a generally round shape, it is to be understood that the shape of aperture can be varied without deviating from the scope of the invention.

As shown, laser beam 534 preferably reflects off a first side 124a of objective mirror 124 and indicator beam 322 preferably reflects off a second side 124b on the opposite side of objective mirror 124. Side 124a is generally coated with a layer to enhance the reflectivity in the laser wavelength. Second side 124b can include a reflector coating or other reflection enhancing mechanism. Alternatively, second side 124b can be left uncoated or coated with an anti-reflector coating, in which case side 124a is used to reflect in opposite directions both the laser beam and the indicator beam. The coating on side 124a can be designed to preferentially reflect both the laser wavelength and the illuminator source wavelength. The use of a two-sided mirror of the type contemplated herein in a laser objective is illustrated and described in U.S. patent application Ser. No. 12/481,363, filed on Jun. 9, 2009, which is assigned to Hamilton Thorne, Inc. the assignee herein which is incorporated by reference as if fully set forth herein.

Whereas the embodiments shown herein illustrate a single objective mirror 124, a plurality of mirrors can be provided as a matter of application specific design choice. In accordance with an embodiment wherein more than one mirror is provided, the laser assembly and the indicator assembly can be on the same side of the optical path, be positioned perpendicularly, etc. without deviating from the scope of the invention. Additionally, whereas a 45° mirror may be preferred, it is to be understood that the angle of mirrors 124, 330, 530 can be varied, as well as the position of the mirror along the optical path of the objective without deviating from the scope of the invention.

Referring next to FIGS. 2 through 7, the modular indicator assembly 300 and the laser assembly 500 are preferably positioned in tubular housings 400, 600, respectively. The tubular housings can comprise a variety of shapes, and have, for example, a circular or rectangular cross section.

As depicted in FIGS. 2-7, the modular assembly 100 including a modular body 200 that includes a turret mount 130 that is arranged and positioned on the turret of a microscope such that the optical beam incident on a lens 336 in FIG. 1, at the base of the objective converges at an angle of less than or equal to about 0.5° with the optic axis at the objective mirror 124. The optical beam emerging from the lens 336 can preferably be collimated and parallel to the optical axis. Once the distance between the laser 510 and the laser collimator lens 520 has been established, such that the laser focus coincides with the visible light focus on the object on the stage, the laser focus can be maintained and adjustments may not be necessary. Preferably, the distance between the laser 510 and the laser collimator lens 520 is established and fixed during manufacture, for example, at the factory. Similarly, the position of the laser beam 534 may be adjusted with regard to dichroic mirror 124. For example a movable mirror may be substituted for the fixed laser mirror 530, enabling the laser beam to be moved across the field of view. It may be preferable to avoid adjusting the laser collimator distance postproduction of the assembly 100. The distance between the indicator aperture 340 and the indicator collimator lens 320 can also be established and fixed during manufacture.

Referring next to FIGS. 2-7, the manner in which the components of the modular objective are assembled is depicted. As illustrated in FIG. 1, in an exemplary embodiment the objective includes an outside housing 110 made of brass, an internal modular body 200 made of brass, [see FIG. 7], a laser module 500 made of aluminum and an indicator module 300 also made of aluminum. Laser module 500 and indicator model 300 are positioned in modular body 200, focused and adjusted in the factory, and then laser module 500 and indicator model 300, are inserted into housing 110. The completed assembly provides a modular objective to be mounted to the turret of a microscope that will avoid interference problems with the turret geometry of most conventional microscopes.

Reference is made to FIG. 7, wherein modular body 200 includes a laser module slot 210 for receiving laser module 500. The modular body also includes an indicator module slot 220 on the opposite side for receiving the indicator module 300. Openings can be provided in the modular body to provide X and Y adjustments to the position of the spot produced by the indicator module during assembly. The modular body also includes a turret mount 130 to permit the objective to be directly mounted to a microscope turret. In the alternative, turret mount 130 can be received in an adapter to permit the objective to be mounted on the turrets of numerous microscopes without departing from the spirit of the instant invention.

As illustrated in FIGS. 5 and 6, laser module 500 can be constructed within a rectangular tube 600. Collimating lens 520 is secured to the tube with a holding screw and with appropriate adhesive. The laser 510 can be preferentially contained within (or without) a TO-can, at a distance from the collimating lens 520 which can be determined by the required confocality of the laser beam 522. The laser position can be adjusted in the lateral XY position and fixed with the screw 517. When the desired position is obtained, screws 517 or other retaining member can hold the laser 510 in position and centralize it. It can then be potted into place with appropriate adhesive.

The desired laser distance from its collimator lens can be determined during assembly to assure that the laser image is produced on the object at exactly the same distance from the objective as the object when the object is in focus. If the objective is corrected for infinity, since the refractive index of typical lens component materials is slightly lower at $\lambda=1450$ nm than in the visible wavelength range, the visible beam can be collimated and the laser beam can converge slightly as it is directed to mirror 530 then paraxial to the optical axis 122 on to the objective lens system.

As discussed above, a diverging lens 336 may be provided below the dichroic mirror. This lens is preferably diverging. The visible beam can converge slightly as it passes down through the dichroic mirror on its way from the objective 120 to diverging lens 336 and the tube lens. The IR beam can subtend a lower angle with the optic axis than the visible beam, in order to achieve confocality between the laser focus and the visible focus. Either adjustment can be made when the laser module is assembled at the factory. It is clear that any combination of lens 336 and objective 120 can be accommodated by varying the laser-collimator distance to focus the laser on the spot being imaged.

In an exemplary embodiment the laser module 500 is prefocused to provide a usable objective, since it is preferred that the laser is focused at exactly the visual focal point on the object. Since the refractive index n of the lens components is lower for the □~1450 nm IR beam than for the visible □~500 nm light [typically if n is refractive index, the reduction in $(n-1)$ is ~5%], the objective focal length in the IR will likely be longer than in the visible range. The laser beam 522 may be more convergent in order to focus at the same point as the visible light, i.e. at the object. Furthermore the optical beam itself may not be exactly collimated at the dichroic mirror 124, which may facilitate obtaining a collimated beam out of the diverging final lens 336, which may require the beam incident on it to be converging. The visible beam can therefore be slightly converging as it travels from objective to lens 336.

In assembling the laser module 600, the objective 120 can be used to produce an image of the object. The laser 510 itself is moved appropriately in the X and Y transverse directions, and the collimator lens 520 is moved in the Z direction, until the laser spot is in the correct position and at the correct focus. The laser can then be sealed in position with supporting screws and/or adhesive.

The indicator assembly 300 is preferably constructed within a similar module 400 having a rectangular or circular cross-section, preferably positioned on the opposite side of the objective 120. The optical elements can include the LED 310, the aperture 340, and the collimating lens 320. The indicator beam can travel initially parallel to the optic axis 122. It can be reflected by an indicator mirror 330 on to the lower surface of the objective dichroic mirror 124, and is preferably reflected from that surface of the dichroic mirror to travel parallel to the optic axis through lens 336 to the microscope tube lens, which preferably focuses the indicator beam 322 to the image plane, either at the eyepiece or on a camera. When the beam is partially transmitted by surface 124b, the transmitted part will be reflected from the other surface 124a and travel parallel to the beam reflected from 124b. The image of the indicator beam or aperture can appear as a small disk at the image plane.

Setting the indicator beam focus can be similar to setting the laser focal adjustment described above. The indicator assembly 300 can be placed in the modular body 200, with a lens of the same focal length and relative optical position as lens 336, so that the microscope tube lens can produce an image on the camera or at the eyepiece plane, and the position of the indicator collimating lens 320 can be adjusted until a clear image of the aperture or indicator beam is visible. At that point the distance between the collimator 320 and the indicator beam source's internal aperture can be fixed, for example, by a holding screw and an appropriate adhesive. The indicator assembly 300 can then be mounted into the housing 110 onto the objective 120.

The thread of the turret mount 130 of the objective 120 is preferably standard RMS [0.800 inch-36 55° Whitworth], the parfocal length is standard 45 mm, and the entire objective 120 can be contained within a shell of outer diameter 31 mm. Other thread types suitable for use in the instant invention include M25@45 mm parfocal length, M45@60 mm parfocal length and M27@45 mm parfocal length.

Embodiments of the invention preferably include the method of mounting a laser assembly 500 (which may be IR (invisible)) and an indicator assembly 300, within the same housing 110 with an objective 120. Such an assembly 100 can preferably produce precise laser irradiation wherever required on the object on the stage of a microscope, as well as a visible position indicator which can be seen on the monitor screen or through the eyepiece.

The examples provided are merely exemplary, as a matter of application specific to design choice, and should not be construed to limit the scope of the invention in any way.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

The invention claimed is:
1. A modular objective assembly for use with a microscope having an eyepiece comprising:
   a mounting modular body mountable onto a turret of the microscope including an objective having an optical axis that permits an image beam to be emitted through the objective toward the eyepiece of the microscope and an objective mirror positioned at an angle to the optical axis of the objective;
   a modular laser assembly positioned on a first side of the objective mirror for directing laser energy toward said objective mirror so that the laser energy is reflected off the objective mirror and through the objective in a direction that is substantially aligned with the optical axis, the modular laser assembly being adapted to be received in said mounting modular body; and
   a modular indicator assembly including a source of light, a collimating lens, and an indicator mirror, received in the modular body and positioned on the opposite side of the objective mirror, the indicator mirror directing a beam of light emitted from the indicator light source through the collimating lens toward the opposite side of the objective mirror to reflect the indicator light in a direction opposite to the direction of the laser energy to permit an optical representation at the eyepiece of the microscope of the position of the laser energy being emitted through the objective.

2. A modular objective assembly as claimed in claim 1, wherein the modular body includes a turret mount to permit the objective assembly to be releasably mounted to the turret of the microscope.

3. A modular objective assembly as claimed in claim 1, wherein the objective mirror is a dichroic mirror, and wherein at least one side thereof has a reflection enhancing surface.

4. A modular assembly as claimed in claim 3, wherein the first side of said objective mirror facing said laser assembly has a reflective coating enhancing reflectivity of at least one of the laser wavelength and the indicator wavelength.

5. A modular objective assembly as claimed in claim 4, wherein the side of the mirror facing the indicator assembly is uncoated or has an anti-reflective coating so that at least part of the beam of light from the indicator assembly is directed to the first side of the objective mirror and is reflected in direction that is opposite to the direction of the laser energy and is substantially aligned with the optical axis of the objective.

6. A modular objective assembly as claimed in claim 4, wherein the objective mirror includes a second reflective coating on the side of the mirror facing the indicator assembly and the beam of indicator light is reflected off of the second reflective coating of the objective mirror in a direction that is opposite to the direction of laser energy and is substantially aligned with the optical axis of the objective.

7. A modular objective assembly as claimed in claim 1, wherein the indicator assembly includes a reducing member having an aperture, the reducing member being positioned between the collimating lens and the indicator light source to provide an effective spot image to the view in the eyepiece of the microscope.

8. A modular objective assembly as claimed in claim 1, wherein the modular laser assembly includes a laser source emitting the laser energy, a second collimating lens collimating the laser energy, and a laser assembly mirror, each fixedly positioned with respect to each other to direct the collimated laser energy at the objective mirror so that the laser energy is reflected off said first side of the objective mirror and through the objective in a direction that is substantially aligned with the optical axis of the objective.

9. A modular objective assembly as claimed in claim 1, wherein the mounting modular body includes a first elongated recess for receiving and supporting said modular indicator assembly, a second elongated recess for receiving and mounting said modular laser assembly, and a turret mount to permit the modular objective assembly to be releasably mounted to the turret of the microscope.

\* \* \* \* \*